UNITED STATES PATENT OFFICE.

GRANVILLE L. GORSLENE, OF ATHENS, OHIO.

COMPOUND FOR NASAL CATARRH.

SPECIFICATION forming part of Letters Patent No. 224,084, dated February 3, 1880.

Application filed November 10, 1879.

*To all whom it may concern:*

Be it known that I, GRANVILLE L. GORSLENE, of Athens, in the county of Athens, State of Ohio, have invented a new and useful Medical Compound for the Treatment of Nasal Catarrh, which compound is fully described in the following specification.

This invention consists in a composition of tincture of opium, carbolic acid, iodide of potassium, and extract of rose.

To prepare the medicine I take of tincture of opium (tinct. opii. U. S. P.) one and one-half ounces; extract rose, (*Rosa gallica*,) one-half ounce; solution carbolic acid made with glycerine, twelve minims; and iodide potassium pulverized, ten grains.

The solution of carbolic acid employed in this compound is made in the following proportions, viz: carbolic acid, four ounces; glycerine, one ounce—that is, four parts of the acid and one part of the glycerine.

The extract of rose employed in the above-described preparation is obtained in the following manner, viz: Take of the dried petals of the red rose (*Rosa gallica*) one and one-half (1½) ounce, and of boiling water one and one-half (1½) pint. Pour the water on the petals in a glass vessel, macerate two hours, then strain, and the fluid is ready for use, to be added to the hereinbefore-described composition in the quantity set forth.

To the above composition I add sufficient pure water to make eight (8) ounces mixture.

The medicine is applied locally. It should be well shaken before using. About a teaspoonful of the medicine is poured into the hand or other suitable receptacle, and is snuffed up through the nostrils. The application should be made twice daily in ordinary cases.

The proportions of the ingredients, as hereinbefore stated, may be varied somewhat to meet individual cases wherein a stronger or weaker compound would be required. The primary effect of this compound is to allay inflammation, ulceration, &c., of the membranes of the nasal passages.

Having thus described my invention, what I claim, and desire to secure by Letters Patent, is—

The compound hereinbefore described, composed of tincture of opium, carbolic acid, extract of rose, iodide of potassium, and water, taken in about the proportions set forth, and for the purposes specified.

The foregoing specification of my invention signed by me this 29th day of October, 1879.

GRANVILLE L. GORSLENE.

In presence of—
HENRY T. BROWN,
A. G. BROWN.